Aug. 16, 1966 J. H. GROVES ETAL 3,266,949
SOLDER FLUX FOR A CAN BODY
Original Filed Feb. 7, 1963
Fig. 1
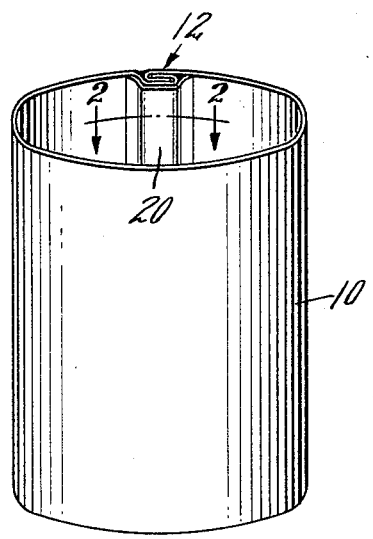
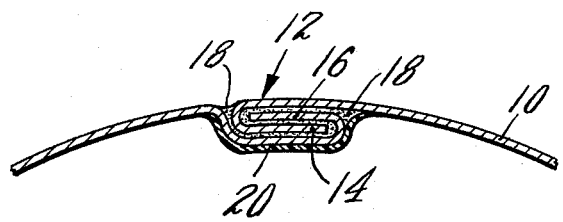
Fig. 2
INVENTORS
JAMES HAMPTON GROVES
LEHMAN EDWARD HOAG
RONALD JOSEPH ZUKOWSKI
BY Robert P. Auber
George W. Reiber
ATTORNEYS

United States Patent Office

3,266,949
Patented August 16, 1966

---

3,266,949
SOLDER FLUX FOR A CAN BODY
James Hampton Groves, Barrington, Lehman Edward Hoag, Cary, and Ronald Joseph Zukowski, Wheeling, Ill., assignors to American Can Company, New York, N.Y., a corporation of New Jersey
Continuation of application Ser. No. 256,925, Feb. 7, 1963. This application Dec. 14, 1964, Ser. No. 427,202
10 Claims. (Cl. 148—23)

This is a continuation of our application Serial No. 256,925 filed February 7, 1963, now abandoned.

The present invention relates to a novel solder flux for a tubular sheet metal can body and particularly to a composition accomplishing the dual function of acting as a fluxing agent for the soft soldering of the side seam of a can body and, after soldering, providing an organic coating film over the soldered side seam.

The sheet metal can industry has consistently sought to improve the ability of the can to withstand corrosive attack by a product packed therein; and conversely to prevent the can from releasing undesirable contaminants into the product. It is known that one of the more troublesome areas subject to attack and to contaminant release is the side seam of the can body; and to a large extent this corrosion susceptibility and contaminant release property is due to the solder fluxes used in promoting the solder-ability of this side seam.

One means of alleviating this difficulty is to use milder solder fluxes which do not leave behind corrosive residues. However, this reduction in flux activity usually lessens the effectiveness of the flux. Another approach has been to deposit a film-forming resin over the side seam in the interior of the can subsequent to the soldering operation. This approach has not been entirely successful because corrosion forming underneath this side seam stripe due to corrosive flux residues adversely affects the adhesion of the stripe to the metal of the can body.

It is therefore an object of the instant invention to provide a novel solder flux which is efficient in its fluxing activity, leaves behind little or no corrosive residues and forms its own covering film over the interior surface of the side seam subsequent to soldering.

A further object is to provide a sheet metal can body, the interior surface of the side seam of which is covered by an adherent organic coating which provides a barrier between the side seam and a product packed in a can made from this body; and which coating provides a base coating to which subsequent protective coatings may be adhered.

Numerous other objects and advantages of the invention will be apparent as it is better understood from the following description, which, taken in connection with the accompanying drawing, discloses a preferred embodiment thereof.

The above objects are accomplished by applying to at least one of the two longitudinally extending can body hooks, prior to their inter-engagement and soldering to form a side seam, a fluxing composition comprising a combination of a soft solder fluxing agent and an organic film-forming material contained in a volatile solvent. Upon forming and soldering the side seam in the well-known manner, the heat of the soldering operation makes the active ingredient in the fluxing agent available to perform its function, removes any volatile solvent remaining in the composition and causes the film-forming material, which floats on the surface of the molten solder traveling through the side seam, to flow out and cover the interior surface of the side seam so that upon cooling of the side seam subsequent to soldering a solid film of an organic coating forms over the interior surface of the side seam.

Referring to the drawings:

FIG. 1 is a perspective view of a sheet metal can body; and

FIG. 2 is an enlarged fragmentary sectional view taken substantially along lines 2—2 of FIG. 1.

As a preferred or exemplary embodiment of the instant invention, FIG. 1 shows a tubular sheet metal, i.e. tin plate, can body 10 having a longitudinally extending side seam generally designated 12. The can body 10 is made in a well-known manner such as by forming a flat blank into substantially tubular configuration, reversely bending the longitudinally extending margins thereof to form outer and inner reversely bent body hooks 14, 16 respectively (FIG. 2), applying a solder flux to at least one of these body hooks, preferably the outer hook 14, and thereafter inter-engaging the body hooks, bumping the thus engaged hooks to mechanically lock them together and flowing molten soft solder into the interstices between the locked body hooks whereby upon cooling, the solid solder 18 bonds and hermetically seals side seam 12. After the flux composition performs its fluxing function, the film-forming ingredient therein, which moves through the interstices of the seam ahead of the molten solder, flows out over the interior of the side seam and its immediately adjacent area. Upon cooling, the film former soldifies and forms a coating 20.

The fluxing-film forming composition of the instant invention comprises a rosin, at least one long chain unsaturated vegetable drying oil, an active fluxing agent which, upon heating, releases a halogen or halogen halide capable of deoxidizing the surface to be soldered and, as a solvent for these ingredients, a volatile organic liquid containing at most a relatively small amount of water.

The rosin constituent for this composition may be rosin, hydrogenated rosin or partially polymerized rosin. The partially polymerized rosin, particularly that sold commercially under the name of Polypale Resin is preferred. This material is present in the composition in an amount of about from 5 to 20% and preferably 10 to 15% by weight. During soldering this rosin provides some of the fluxing action; and subsequent to soldering aids in forming a film over the soldered joint.

For utility in the composition the drying oil must have an iodine value of not less than 90. Vegetable drying oils meeting this definition are chinawood oil, dehydrated castor oil, oiticica oil and the like. The unsaturated vegetable drying oil component may be composed of a single oil or a mixture of suitable oils. These drying oils are present in the flux in an amount of 5 to 20% and preferably about 10 to 15% by weight. Although the drying oil is believed to provide some fluxing action, its main function is as a film former in the coating 20.

Th active fluxing ingredient in the composition may be a halogenated hydrocarbon, a halogenated long-chain fatty glyceride or an amine hydrohalide. The halogenated hydrocarbons are of the type described in U.S. Patent # 2,564,199 in which are described chlorinated paraffins containing various percentages of combined chlorine. Of these chlorinated hydrocarbons disclosed in this patent only those having not more than 40% chlorination are used in the instant invention. Using the lower percent chlorination hydrocarbons obviates the necessity for incorporating the organic zinc compound specified in the patent.

Either animal or vegetable fatty glycerides are suitable for halogenation, preferably chlorination, to provide an active fluxing agent. As with the halogenated hydrocarbons, the halogenated fatty glycerides must contain 40% or less combined chlorine to obviate the necessity of an activating agent such as an organic zinc soap. Vegetable drying oils of the type specified hereinbefore having up to 40% combined chlorine are examples of suitable halogenated fatty glycerides for use in the instant invention.

Because of their good fluxing activity and solubility in organic solvents, the amine hydrohalides are preferred and particularly oxygen-containing, organic amine hydrochlordies, particularly mono- or diethanolamine hydrochloride, or morpholine hydrochloride or mixtures thereof. Other mono- and di- lower alkanolamine hydrochloride salts may be used, i.e. those in which the alkanol group contains 1 to 4 carbon atoms. For utility in the subject composition the halogenated hydrocarbons or halogenated fatty glycerides must be present in about from 1 to 5% and preferably about 3% by weight; whereas the amine hydrohalide is present in the flux in an amount of about from 0.2 to 2% by weight, and preferably from .75 to 1% by weight.

It has been found that water in a soft solder flux composition tends to vaporize explosively when subjected to the heat of the soldering operation. This extremely rapid vaporization of the water appears to cause splattering of the flux beyond the area the flux is intended to treat. Such a result is undesirable since it may lead to discolored spots on areas of the can body removed from the side seam and, in some cases, to small sites of corrosion. For this reason, the flux useful in the instant invention should contain as little water as possible.

To solubilize all of the ingredients in the composition a mixture of compatible anhydrous solvents is used. For example, the drying oils are soluble in ketones and ether-alcohols but insoluble in alcohols; whereas the rosin is soluble in alcohols and aliphatic hydrocarbon liquids having a boiling range of about from 100 to 150° C. The halogenated hydrocarbons and halogenated fatty acid glycerides are insoluble in alcohol but soluble in the aliphatic hydrocarbon solvent; whereas the amine hydrohalide is soluble in alcohol but insoluble in the hydrocarbon solvent.

Since the drying oil is an essential ingredient of the instant flux composition the volatile solvent must contain a lower alkyl ketone, e.g. methyl-ethyl-ketone, or a lower alkoxy alkanol or lower alkyl ester thereof, e.g. 2-ethoxy ethanol or 2-ethoxy ethyl acetate. If the active fluxing agent is to be a chlorinated hydrocarbon or chlorinated fatty glyceride, then the remainder of the solvent system must be the above described aliphatic hydrocarbon solvent to provide solubility for the rosin and chlorine-containing fluxing agent. If, however, the active fluxing agent is to be an amine hydrochloride, a lower alkanol must be used in conjunction with the ketone, ether alcohol or ester thereof to provide solubility for the rosin and amine hydrochloride.

By the term lower alkyl used above is meant an alkyl group containing 1 to 4 carbon atoms. The weight ratio of ketone or ether-alcohol or ether-alcohol ester to aliphatic hydrocarbon or alkanol in the flux composition is about from 2/1 to 1/4 and preferably about 1/2 depending upon the relative quantities of drying oil and rosin. These organic solvents are present in the composition in an amount of about from 65 to 85% by weight and preferably about 80% by weight.

As indicated previously, the instant composition is applied to at least one of the body hooks as a liquid prior to bumping and soldering of the side seam. After bumping but before soldering, the mechanically locked side seam is preheated by any suitable means such as passing the side seam over a plurality of gas burners. During this preheating step substantially all of the volatile solvents are removed leaving a mobile residue of unreacted film-forming material, e.g. rosin and drying oils, and fluxing agent, e.g. amine hydrohalide. After leaving the preheaters the side seam passes through the soldering operation which, in standard commercial practice, is a series of metal solder rolls rotating in a bath of molten solder. When the seam contacts the hot molten solder carried on the rolls, the fluxing agent decomposes and produces volatile fluxing gases such as hydrogen chloride. The fluxing gas cleans the surface of the metal so that the solder will wet this surface and thereafter escapes into the atmosphere or preferably into a collecting hood. During and after passing over the solder roll the heat therefrom plus the surrounding air causes the rosin-drying oil part of the composition to cure into the infusible solid coating 20.

The following examples are by way of explanation and are not to be construed as a limitation of the subject invention:

| Ingredient | Parts By Weight | | |
|---|---|---|---|
| | A | B | C |
| Polypale resin | 10.0 | 14.0 | 14.0 |
| Chinawood oil | 8.0 | 5.0 | 5.0 |
| Dehydrated castor oil | 2.0 | 2.0 | 2.0 |
| Diethanolamine hydrochloride | 1.0 | 1.0 | 0.75 |
| Water [1] | 1.0 | 1.0 | 1.0 |
| Methyl isobutyl ketone | 39.0 | 38.65 | 25.75 |
| Anhydrous isopropyl alcohol | 39.0 | 38.60 | 51.50 |

[1] Present from concentrated hydrochloric acid to make the amine hydrochloride.

To prepare the fluxing compositions A, B or C, the diethanolamine hydrochloride is dissolved in sufficient anhydrous isopropyl alcohol to make a 7% solution. This solution is neutralized with concentrated hydrochloric acid until the pH of a small sample of the solution, diluted with an equal volume of water, falls in the range 7.2–7.6.

The remainder of the isopropyl alcohol is mixed with the methyl isobutyl ketone. Then the Polypale resin is dissolved in the mixed solvent, followed by the addition of the chinawood oil and dehydrated castor oil, and finally by the addition of the 7% solution first prepared.

The above compositions were used as fluxes in the soft-soldering of a tin plate can body side seam in the manner heretofore described. Cans with the side seam formed using the instant fluxes when compared to cans with side seams formed using the standard commercial beer can flux showed a reduction of several hundred percent in iron pick-up by the product packed in these cans and an appreciable increase in side seam blow-up strength.

It is thought that the invention and many of its attendant advantages will be understood from the foregoing description and it will be apparent that various changes may be made in the matter of the ingredients, the identity and the proportions of the formulation, and that changes may be made in the form, construction and arrangement of the parts of the article without departing from the spirit and scope of the invention or sacrificing all of its material advantages, the form hereinbefore described being merely a preferred embodiment thereof.

We claim:

1. A soft solder fluxing and film-forming composition consisting essentially of, by weight, about from 5 to 20% of a rosin, about from 0.2% to 2.0% of a fluxing agent consisting of a halogen-containing aliphatic organic compound, about from 65 to 85% of a volatile solvent, and about from 5 to 20% of a long chain unsaturated vegetable drying oil selected from the group consisting of chinawood oil, dehydrated castor oil, oiticica oil and mixtures thereof, said drying oil improving the fluxing and film-forming properties of said composition.

2. The composition set forth in claim 1 wherein said rosin is a partially hydrogenated rosin.

3. The composition set forth in claim 1 wherein said drying oil is a mixture of chinawood oil and dehydrated caster oil.

4. The composition set forth in claim 1 wherein said fluxing agent is an amine hydrohalide.

5. The composition set forth in claim 4 wherein said amine hydrohalide is diethanolamine hydrochloride.

6. The composition set forth in claim 4 wherein said amine hydrohalide is morpholine hydrochloride.

7. The composition set forth in claim 1 wherein said solvent is predominantly an anhydrous mixture of a liquid selected from the group consisting a lower alkanol and an alkane boiling in the range of from 100 to 150° C. and a liquid selected from the group consisting of a lower alkyl ketone, a lower alkoxy-lower alkanol, a lower alkyl ester of said alkoxy-alkanol, and mixtures thereof.

8. In a tubular sheet metal can body having a longitudinally extending side seam comprising a plurality of layers of metal bonded together with a soft solder, the improvement comprising:

a solid film of the thermal reaction product of rosin and an unsaturated vegetable drying oil selected from the group consisting of chinawood oil, dehydrated castor oil, oiticica oil and mixtures thereof covering said side seam on the interior of said body, said film being thermally reacted to its solid state by the heat of the soldering.

9. A soft solder fluxing and film-forming composition consisting essentially of, by weight, about 5 to 20% of a rosin, about from 0.2 to 2.0% of an amine hydrochloride selected from a group consisting of morpholine hydrochloride, monoethanolamine hydrochloride, diethanolamine hydrochloride and mixtures thereof, about from 65 to 85% of a solvent consisting essentially of a lower alkanol and a member of the group consisting of a lower alkyl ketone, a lower alkoxy alkanol, a lower alkyl ester of said alkoxy alkanol, and mixtures thereof, and about from 5 to 20% of a vegetable drying oil selected from the group consisting of chinawood oil, dehydrated castor oil, oiticica oil and mixtures thereof to improve the fluxing and film-forming properties of said composition.

10. A soft solder fluxing and film-forming composition consisting essentially of, by weight, about from 10 to 15% of partially hydrogenated rosin, about 0.75 to 1% of diethanolamine hydrochloride, about from 77 to 80% of a mixture of methyl isobutyl ketone and anhydrous isopropyl alcohol, and about from 7 to 10% of a mixture of chinawood oil and dehydrated castor oil to improve the fluxing and film-forming properties of said composition.

References Cited by the Examiner
UNITED STATES PATENTS

| | | | |
|---|---|---|---|
| 2,069,247 | 2/1937 | Hoag | 117—97 |
| 2,901,387 | 8/1959 | Forker et al. | 148—23 |
| 3,035,926 | 5/1962 | Larrieu | 117—134 X |

HYLAND BIZOT, *Primary Examiner.*

DAVID L. RECK, *Examiner.*

H. F. SAITO, *Assistant Examiner.*